United States Patent
Reed et al.

(10) Patent No.: US 8,063,775 B2
(45) Date of Patent: Nov. 22, 2011

(54) ENERGY MANAGEMENT SYSTEM

(75) Inventors: Thomas A. Reed, Toledo, OH (US);
Douglas A. Wittenmyer, Maumee, OH (US)

(73) Assignee: Bay Controls, LLC, Maumee, OH (US)

( * ) Notice: Subject to any disclaimer, the term of this patent is extended or adjusted under 35 U.S.C. 154(b) by 321 days.

(21) Appl. No.: 12/418,102

(22) Filed: Apr. 3, 2009

(65) Prior Publication Data

US 2009/0259346 A1    Oct. 15, 2009

Related U.S. Application Data

(60) Provisional application No. 61/044,080, filed on Apr. 11, 2008.

(51) Int. Cl.
| | | |
|---|---|---|
| *G08B 1/08* | (2006.01) | |
| *G08B 21/10* | (2006.01) | |
| *G05B 23/02* | (2006.01) | |
| *G05B 21/00* | (2006.01) | |
| *G05B 13/00* | (2006.01) | |
| *G05B 15/00* | (2006.01) | |
| *G01M 1/38* | (2006.01) | |
| *G05D 23/00* | (2006.01) | |
| *G05D 7/00* | (2006.01) | |
| *G05D 11/00* | (2006.01) | |
| *G05D 3/12* | (2006.01) | |
| *G05D 5/00* | (2006.01) | |
| *G05D 9/00* | (2006.01) | |
| *G05D 17/00* | (2006.01) | |
| *G01R 11/56* | (2006.01) | |
| *G01R 21/133* | (2006.01) | |
| *G06F 17/00* | (2006.01) | |

(52) U.S. Cl. ............ 340/539.26; 340/3.1; 340/539.14; 340/539.22; 340/635; 700/278; 700/282; 700/291; 700/300; 705/412

(58) Field of Classification Search .............. 700/275, 700/276, 278, 286, 291, 299, 300, 282; 705/412; 340/1.1, 3.1, 500, 531, 533, 539.1, 539.14, 340/540, 635, 539.22, 539.26
See application file for complete search history.

(56) References Cited

U.S. PATENT DOCUMENTS

| | | | |
|---|---|---|---|
| 4,847,781 A | | 7/1989 | Brown, III et al. |
| 4,916,909 A | | 4/1990 | Mathur et al. |
| 6,160,993 A | | 12/2000 | Wilson |
| 6,618,709 B1 | | 9/2003 | Sneeringer |
| 6,801,003 B2 | * | 10/2004 | Schanberger et al. ........ 315/291 |
| 6,934,862 B2 | * | 8/2005 | Sharood et al. ............... 713/300 |
| 7,292,898 B2 | * | 11/2007 | Clark et al. ...................... 700/9 |
| 7,379,997 B2 | | 5/2008 | Ehlers et al. |

(Continued)

*Primary Examiner* — Crystal J Barnes-Bullock
(74) *Attorney, Agent, or Firm* — Fraser Clemens Martin & Miller LLC; J. Douglas Miller

(57) ABSTRACT

An energy management system includes a control and uplink module adapted to selectively monitor and control at least one energy consuming device, the control and uplink module in communication with an electronic storage device and adapted to transmit data to the electronic storage device, a sensor in communication with the control and uplink module, wherein the sensor is adapted to execute a pre-configured measurement and transmit a signal to the control and uplink module representative of the measurement, and an interface adapted for the entry of at least one operational parameter to the control and uplink module, at least one of the signal from the sensor and the operational parameter employed by the control and uplink module to facilitate an operation of the energy consuming device, the interface employing the data transmitted to the storage device to provide an analysis of an operation of the energy consuming device.

10 Claims, 2 Drawing Sheets

U.S. PATENT DOCUMENTS

| | | | |
|---|---|---|---|
| 7,565,225 B2 * | 7/2009 | Dushane et al. | 700/276 |
| 2005/0144437 A1 | 6/2005 | Ransom et al. | |
| 2008/0147461 A1 * | 6/2008 | Lee et al. | 705/7 |
| 2008/0167756 A1 * | 7/2008 | Golden et al. | 700/297 |

* cited by examiner

ENERGY MANAGEMENT SYSTEM

CROSS-REFERENCE TO RELATED APPLICATION

This application claims the benefit of U.S. provisional patent application Ser. No. 61/044,080 filed Apr. 11, 2008.

FIELD OF THE INVENTION

The invention relates to an energy management system, and more specifically to an energy management system for monitoring, controlling, analyzing, and reporting the consumption of energy by HVAC systems, water heaters, lighting fixtures, and the like.

BACKGROUND OF THE INVENTION

The environmental conditions of an enclosed area such as a residential home, an office, or an industrial use building are maintained by employing energy consuming devices such as a furnace, an air conditioning unit, a water heater, a lighting fixture, and the like. These devices consume energy such as electrical energy or heat energy from natural gas, for example, to produce a desired environmental condition within the enclosed area. The increasing cost of the energy required to power these devices has caused consumers to seek out devices that are more efficient and methods of operating the devices that result in an increased operational efficiency of the devices.

The marketplace currently includes numerous apparatuses adapted to facilitate the efficient operation of the energy consuming devices. Examples of such are programmable electronic thermostats, timers for lighting, and timers for water heaters. These apparatuses are typically stand alone items that work with a single energy consuming device. The apparatuses do not provide a systematic approach to monitoring and operating all the energy consuming devices typically employed to achieve the desired environmental conditions within the enclosed area.

The current apparatuses do not provide direct feedback to a user as to the energy savings resulting from the use of the apparatuses. Additionally, consumers often take other steps to reduce energy consumption such as adding insulation to the enclosed area, and selecting set points for the furnace and the air conditioner that should result in a reduced consumption of energy. The consumer does not have a reliable method to determine whether the apparatuses or the other steps have reduced the energy consumption. Typically the consumer has a final utility bill that allows for a comparison of the energy costs from before and after the apparatus was installed or the other energy reducing steps were completed. The cost of the consumed energy shown in the utility bill does not take into account factors such as outside temperature, rainfall, wind speeds, or hours of daylight, for example, to allow a consumer to determine whether the apparatus or the other steps taken have actually resulted in a reduction in energy consumption and/or an improved operational efficiency of the energy consuming devices.

It would be desirable to have an energy management system adapted to monitor, control, and provide analysis of the consumption of energy by energy consuming devices.

SUMMARY OF THE INVENTION

Concordant and consistent with the present invention an energy management system adapted to monitor, control, and provide analysis of the consumption of energy by energy consuming devices, has surprisingly been discovered.

The above objective as well as others, may be achieved by an energy management system comprising: a control and uplink module adapted to selectively monitor and control at least one energy consuming device, the control and uplink module in communication with an electronic storage device and adapted to transmit data to the electronic storage device; a sensor in communication with the control and uplink module, wherein the sensor is adapted to execute a pre-configured measurement and transmit a signal to the control and uplink module representative of the measurement; and an interface adapted for the entry of at least one operational parameter to the control and uplink module, at least one of the signal from the sensor and the operational parameter employed by the control and uplink module to facilitate an operation of the energy consuming device, the interface employing the data transmitted to the storage device to provide an analysis of an operation of the energy consuming device.

In another embodiment, an energy management system for an enclosed area comprises: a control and uplink module adapted to selectively monitor and control at least one energy consuming device; a sensor adapted to execute a pre-configured measurement and generate a signal representative of the measurement; a server for receiving a data from at least one of the control and uplink module and the sensor to generate an analytical energy model of the enclosed area; and an interface adapted for the entry of at least one operational parameter to server, wherein at least one of the signal from the sensor, the data on the server, and the operational parameter is employed by the server to regulate the control and uplink module and thereby facilitate an operation of the energy consuming device.

The above objective may also be achieved by a method of controlling and monitoring an energy consuming device comprising the steps of: providing a control and uplink module adapted to selectively control at least one energy consuming device; providing an interface adapted for the entry of at least one operational parameter to the control and uplink module; providing a sensor to execute a pre-configured measurement and generate a signal to at least the representative of the measurement; providing a server for receiving a data from at least one of the control and uplink module and the sensor to generate an analytical energy model of the enclosed area; adjusting an operation of the energy consuming device is response to at least one of the at least one operational parameter, the signal transmitted by the sensor, and the data received by the server; and recording an electronic data representing at least one of the at least one operational parameter, the signal transmitted by the sensor, and the data received by the server.

BRIEF DESCRIPTION OF THE DRAWINGS

The above, as well as other objects and advantages of the invention, will become readily apparent to those skilled in the art from the following detailed description of an embodiment of the invention when considered in the light of the accompanying drawings, in which.

DETAILED DESCRIPTION OF AN EMBODIMENT OF THE INVENTION

The following detailed description and appended drawing describe and illustrate various exemplary embodiments of the invention. The description and drawing serve to enable one skilled in the art to make and use the invention, and are not intended to limit the scope of the invention in any manner. In respect of the methods disclosed, the steps presented are exemplary in nature, and the order of the steps is not regarded as necessary or critical.

Figure 1:
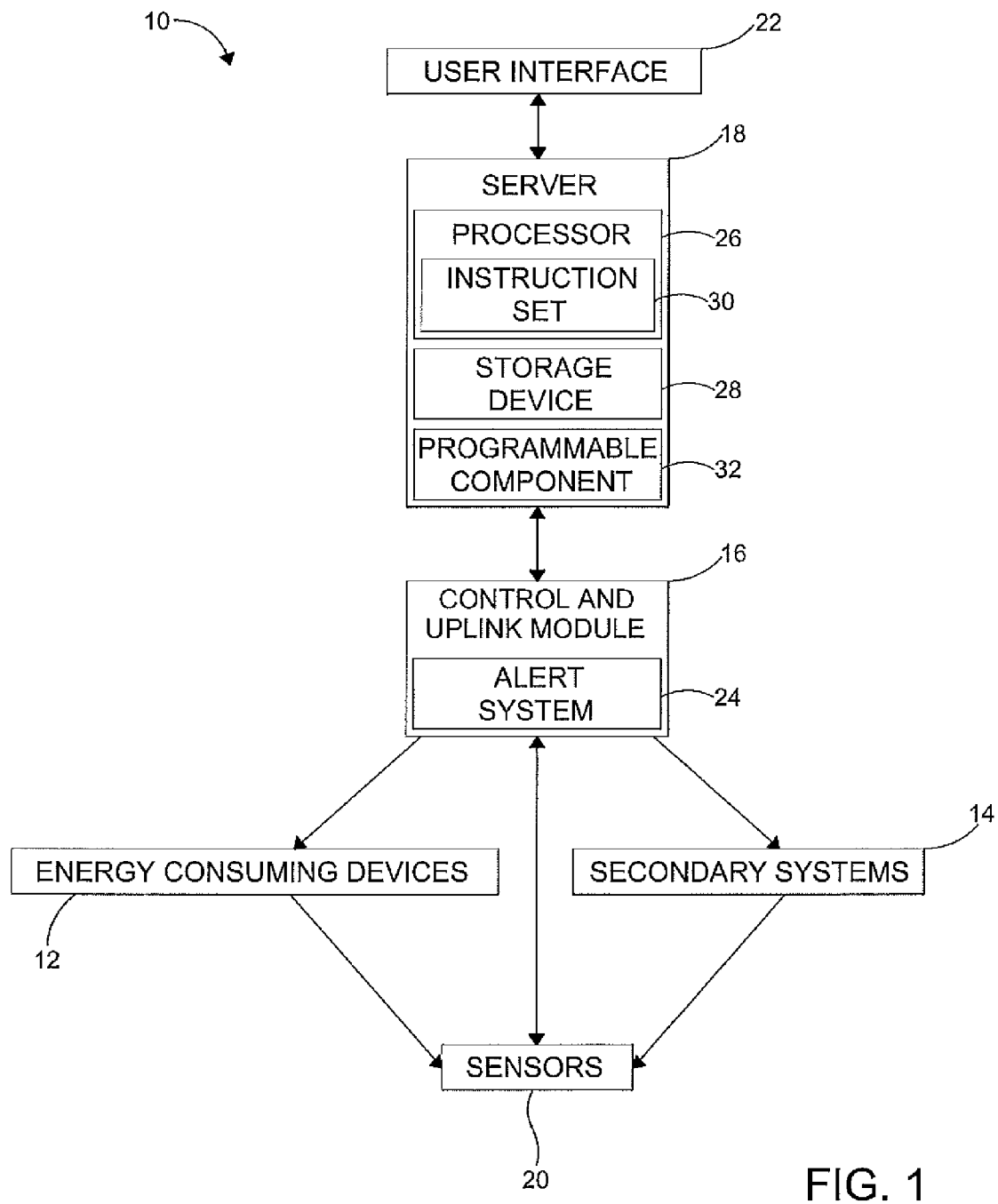
FIG. 1 is a schematic illustration of an energy management system for monitoring, controlling, and providing analysis of the consumption of energy by environmental control devices according to an embodiment of the present invention.
Figure 2:
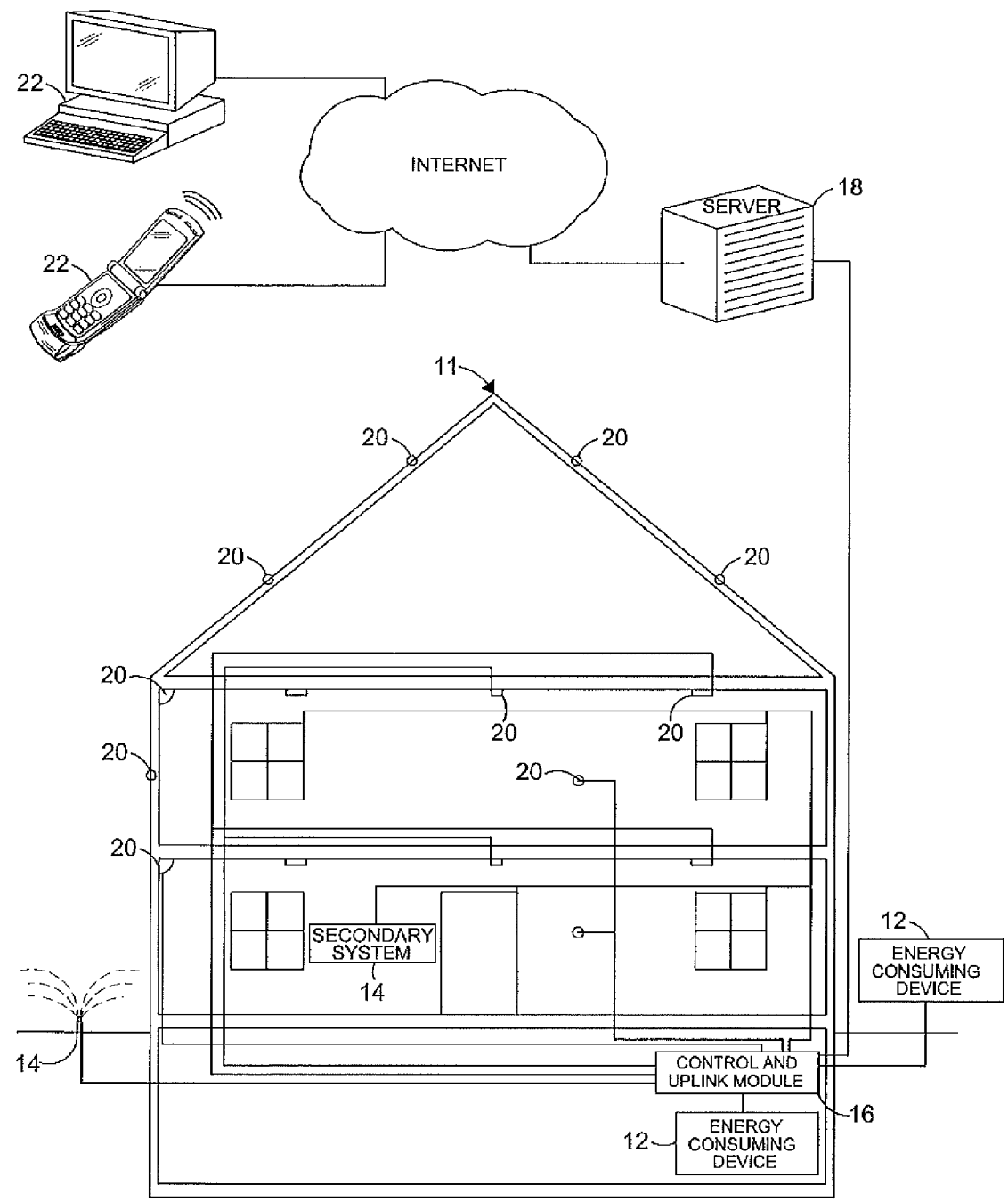
FIG. 2 is a schematic illustration of the energy management system of FIG. 1, showing the energy management system installed in an enclosed area.

FIGS. 1 and 2 show an energy management system 10 according to an embodiment of the present invention. The system 10 is adapted to monitor and control at least one energy consuming device 12 such as a furnace, an air conditioner, a lighting circuit, or a water heater, for example, to maintain desired environmental conditions of an enclosed area 11 such as a residential home, an office, or an industrial use building. However, it is understood that other energy consuming devices may be monitored and controlled such as home electronics, for example. The system 10 can also be employed to provide control and automation of a secondary system 14 such as a security system, and an outdoor sprinkler system, for example. It is further understood that any number of energy consuming devices 12 and secondary systems 14 or devices may be monitored and controlled by the energy management system 10. As shown the system 10 includes a control and uplink module 16, a server 18, a plurality of sensors 20, and a user interface 22. It is understood that any number of sensors 20 and user interfaces 22 may be used.

The control and uplink module 16 is typically disposed within the enclosed area 11 and is in communication with each of the energy consuming devices 12, the secondary system 14, the server 18, the sensors 20, and the user interface 22. However, it is understood that the module 16 may be disposed in any location and in communication with any component of the system 10. In certain embodiments, the module 16 is "hard wired" to a component of the system 10 using convention electrical wiring systems. As a non-limiting example, the energy consuming device 12 is connected to the module 16 using a conventional 4-wire HVAC/thermostat wiring system. As a further example, at least one sensor 20 (e.g. thermostat) may be directly connected to the module 16 using a conventional electrical wiring system such as a 4-wire HVAC/thermostat wiring system. Additionally, the server 18, sensors 20, and the user interface 22 may communicate with the module 16 through a network (e.g. internet). It is understood that any communication connection may be used to provide signal and data transfer between the module 16 and the other components of the system 10 such as a network cable and wireless communication devices (e.g. powerline Ethernet adapter and X.10 protocol devices).

In certain embodiments, the module 16 includes an alert system 24 for generating and transmitting an automatic notification to a user upon the occurrence of a selected event. As a non-limiting example, the alert system 24 is a programmable processor with a communications device adapted to transmit a communications signal to a pre-determined electronic device. For example, the alert system 24 can transmit an electronic mail or cellular phone text message to the user in the event of a power failure, a pre-determined sensor input, a detection of an abnormal environmental condition, or a detection of an abnormal consumption of energy. It is understood that the alert system 24 may be configured to communicate with any electronic device in response to any condition or threshold signal received by the module 16.

The server 18 is in communication with the control and uplink module 16 and the user interface 22. As a non-limiting example, the communication between the server 18 and at least one of the control and uplink module 16 and the user interface 22 is an internet connection. However, other means for communicating may be used such as a private network system, for example. As shown, the server 18 includes a processor 26 and a storage device 28.

The processor 26 is adapted to analyze the data received by the server 18 and store the data in the storage device 28 and transmit a module control signal to the module 16 for regulating at least one of the energy consuming device 12, the secondary system 14, and the sensors 20. In certain embodiments, the functions of the processor 26 are controlled based upon an instruction set 30.

The instruction set 30, which may be embodied within any computer readable medium, includes processor executable instructions for configuring the processor 26 to perform a variety of tasks. As a non-limiting example, the instruction set 30 includes a plurality of control methods and algorithms for optimizing regulation and efficiency of the system 10. Specifically, the instruction set 30 may include methods, algorithms, and formulas relating to a Bay Solar Index (BSI), a heating control bias, and a cooling control biasing, for example.

The Bay Solar Index (BSI) is defined as an index to be used in determining the amount of solar energy received at a location of the enclosed area 11, wherein BSI=sky_condition*Solar Irradiance (where the sky condition is a percentage of cloud coverage based on the currently reported weather at a given location and the solar irradiance is calculated from the location (lat/long) and time of day.)

The heating control bias adapts a set point of that energy consuming device 12 based on outside environmental conditions for improved comfort and energy savings and is represented by the following formulas: bias_delta=(set point−OutsideTemp−HeatDeltaOffset)/HeatDeltaGain, wherein HeatDeltaOffset is defined a threshold difference between inside and outside temperature that will not cause a temperature set point adjustment (i.e. an offset of 10 means that the difference must be greater than 10 before the set point is adjusted, and the adjustment is based on the difference−10) and HeatDeltaGain is defined as a difference between inside and outside temperature that will cause a 1 degree F. change in set point (i.e. a gain of 3 means that for every 3 degree difference, the set point will be adjusted by 1 degree); bias_wind=(Wind−WindOffset)/WindDeltaGain, wherein wind is defined as the measured wind speed (mph), WindDeltaOffset is defined as the amount of wind speed (mph) that will not cause a temperature set point adjustment (i.e. An offset of 20 means that the wind speed must be greater than 20 before the set point is adjusted, and the adjustment is based on the wind speed−20), and WindDeltaGain is defined as the amount of wind speed (mph) that will cause a 1 degree F. change in set point (i.e. a gain of 5 means that for every 5 mph of wind, the set point will be adjusted by 1 degree), and; bias_solar=(Solar−SolarDeltaOffset)/SolarDeltaGain, wherein Solar is the Bay Solar Index (BSI) (%), SolarDeltaOffset is defined as the value of Bay Solar Index (BSI) (%) that will not cause a temperature set point adjustment (i.e. an offset of 50 means that the BSI must be greater than 50% before the set point is adjusted, and the adjustment is based on the BSI−50) and SolarDeltaGain is defined as the value of Bay Solar Index (BSI) (%) that will cause a 1 degree F. change in set point (i.e. a gain of 25 means that for every 25% of BSI, the set point will be adjusted by 1 degree). It is understood that where bias_wind is used, the set point=set point+(bias_delta*bias_wind)=bias_solar, otherwise, set point=set point+bias_delta−bias_solar, wherein a total bias may be limited to a configurable value.

The above formulas may be adapted to provide a cooling control bias for adapting the set point based on outside environmental conditions for improved comfort and energy savings. The cool set point is determined as: bias_delta=(OAT−SpCool−CoolDeltaOffset)/CoolDeltaGain, wherein OAT is outside air temperature, SpCool is the current temperature set point, CoolDeltaGain is defined as the amount of difference between inside and outside temperature that will cause a 1 degree F. change in set point (i.e. a gain of 3 means that for every 3 degree difference, the set point will be adjusted by 1 degree), and CoolDeltaOffset is defined as the amount of difference between inside and outside temperature that will not cause a temperature set point adjustment (i.e. an offset of 10 means that the difference must be greater than 10 before the set point is adjusted and the adjustment is based on the difference−10); bias_wind=(Wind−CoolWindOffset)/CoolDeltaGain; bias_solar=(Solar−CoolSolarOffset)/CoolSolarGain; and cool set point final=cool set point+bias_delta−bias_wind−bias_solar, wherein a total bias may be limited to a configurable value.

The instruction set 30 may also include a method for proportional, integral, and derivative (PID) control based on at least one of a set point selection, an energy model output for a particular user activity, a calculated amount of solar energy received, a wind speed, an air temperature, and any other measurement received by the sensors 20. Additionally, the instruction set 30 may include a method for controlling the module 16 based upon a difference between air temperature within the enclosed area 11 and air temperature outside of the enclosed area 11. As a further example, the instruction set 30 may include a method for controlling air circulation within the enclosed area 11 and ventilation controls based upon any one of the measurements received by the sensors 20. As yet another example, the instruction set 30 may include a method for adapting a pre-defined schedule of operation of the energy consuming devices 12 and the secondary systems 14 based upon sensor measurements received by the sensors 20 (e.g. motion sensor and light sensor). It is understood that other methods and algorithms may be encoded within the instruction set 30 to provide various control features and schedules to a user such as demand limitation algorithms based upon energy usage and cost thresholds and efficiency models that are pre-determined for maximum comfort or efficiency, for example.

The storage device 28 may be a single storage device or may be multiple storage devices. Furthermore, the storage device 28 may be a solid state storage system, a magnetic storage system, an optical storage system or any other suitable storage system or device. It is understood that the storage device 28 is adapted to store the instruction set 30. Other data and information may be stored in the storage device 28 such as user account information and data representing characteristics of a particular enclosed area (e.g. structure type, insulation value, type of HVAC equipment, size of area, orientation of structure, location of structure, and window characteristics). Additionally, any detected environmental conditions and other data received from the sensors 20 and other data sources (e.g. weather databases) may be electronically stored in the storage device 28. Thereafter, the storage device 28 can be accessed to retrieve the information and data stored therein.

The server 18 may further include a programmable component 32. The programmable component 32 is in communication with the processor 26. It is understood that the programmable component 32 may be in communication with any other component of the system 10 such as the module 16 and the database 28, for example. In certain embodiments, the programmable component 32 is adapted to manage and control processing functions of the processor 26. Specifically, the programmable component 32 is adapted to control the analysis of the signals and data received by the server 18 and the generation and transmission of the module control signal. The programmable component 32 provides a means for a user to actively manage the operation of the processor 26 and thereby control the resultant operation of at least one of the energy consuming device 12, the secondary system 14, and the sensors 20. It is understood that the programmable component 32 may be adapted to store data and information on the storage device 28 and retrieve data and information from the storage device 28.

The sensors 20 are selectively disposed both within the enclosed area 11 and outside of the enclosed area 11 to make pre-configured measurements and thereby provide an analytical energy model of the enclosed area 11. It is understood that any number of sensors 20 may be used. As a non-limiting example, the sensors 20 are adapted to detect environmental conditions outside of the enclosed area 11 such as an air temperature, a wind speed and direction, a dew point, a humidity, a barometric pressure, a solar angle, and a solar energy level, for example. Additionally, the sensors 20 may be adapted to measure environmental characteristics within the enclosed area 11 such as an air temperature, zone air temperature, and a humidity. Other data points can be detected such as a precipitation, quantity of heat energy added per time interval, efficiency of heat equipment, quantity of cooling energy added per time interval, efficiency of cooling equipment, electrical power consumption, and fuel consumption (e.g. natural gas, oil, propane), for example. It is understood that the sensors 20 may be adapted to measure any environmental condition and energy characteristic. It is further understood that other sensors and detectors may be used such as a motion sensor.

In certain embodiments, the sensors 20 are adapted to control the energy consuming devices 12 and the secondary systems 14 such as by providing a thermostat device for detecting the temperature within the enclosed area 11 and energizing the furnace and air conditioner, for example. In such a case, the module 16 provides set points or other parameters to the sensor 20 (e.g. thermostat) to facilitate the control of the energy consuming devices 12.

The user interface 22 facilitates entering selected settings and operational parameters employed by the system 10 to control the energy consuming devices 12 and the secondary systems 14. The user interface 22 also provides real time monitoring of the current environmental conditions of the enclosed area 11 and operational status of the energy consuming devices 12 and secondary systems 14. In the preferred embodiment, the user interface 22 is an interactive web site accessible by any device with internet connectivity. The user is provided with an account associated with his or her system 10. The user can access his or her account through the web site and enter selected set points and parameters that determine the operation of the energy consuming devices 12 and the secondary systems 14. For example, the consumer can enter a temperature set point for the furnace and the air conditioner; a limit on total energy consumption over a specified time period; a time to turn on a selected light circuit; a time to turn on a lawn sprinkler; or a time to disable or enable a security system. Additionally, the user can select other parameters such as whether to accept adjustments to a selected temperature setting or lighting schedule in the event the local utility is experiencing a peak electrical demand, or set parameters for when the enclosed space is not occupied or when the occupants are sleeping, for example. It should be understood that an alternate user interface can be provided such as a key pad and text display unit in communication with the module 16, or a telephone dial in interface adapted to accept updated settings and parameters to the system 10. Further, it should be understood that the user interface 22 enables a user to remotely monitor and control the energy consuming devices 12 and the secondary systems 14.

The user interface 22 also includes a feedback report function to provide the user with information in respect of the energy consumption of the energy consuming devices 12 and the secondary systems 14. One such feedback report is an energy score that provides a measure of the efficiency of heating and cooling the enclosed area 11. The energy score provides the energy required to heat or cool the enclosed area 11 for each degree difference between the temperature outside the enclosed space and the temperature inside the enclosed space. The energy score is normalized by factoring in the square footage of the enclosed area 11. A consumer can compare the energy score to the energy score of other enclosed structures to determine or help identify energy saving opportunities. Additionally, the energy score can be utilized to determine the effectiveness of steps the consumer has taken to minimize energy consumption. The energy score can also include wind speed and direction data to facilitate an analysis of the enclosed structure for air leaks.

In use, the control and uplink module 16 is installed in the particular enclosed area 11. Additionally, an internet connection or other suitable communication means is established between the module 16 and the server 18. The control and uplink module 16 is also in communication with at least one of the energy consuming devices 12, the secondary systems 14, and the sensors 20. The sensors 20 are arranged as desired and placed in communication with the module 16 to transmit the sensor signals to the module 16, wherein the sensor signals represent sensor measurements such as environmental conditions, operating conditions of the energy consuming devices 12 and the secondary systems 14, and the energy consumption of the energy consuming devices 12 and the secondary systems 14. Each of the sensors 20 is adapted to measure a pre-determined condition or characteristic and transmit the sensor signal representing the measured characteristic. For example, a motion sensor may be used to determine whether the enclosed area 11 is occupied or unoccupied. Further, the sensors 20 can be provided to measure the quantity of energy being consumed by the energy consuming devices 12 such as kilowatts of electrical power or cubic feet of natural gas, for example.

The user accesses the server 18 through the user interface 22. In a preferred embodiment, the interface 22 is an interactive web site adapted to enable the user to establish an account associated with his or her system 10. As a non-limiting example, a bi-directional communication is established between a web-accessible electronic device and the server 18 using port 443 (https). The user selectively inputs an operational parameter for the system 10 such as a desired temperature for the enclosed area 11 or a temperature differential between the enclosed area 11 and an ambient temperature. The parameters are electronically stored on the server 18 and transmitted to the module 16. The module 16 employs the parameters received from the server 18 and any inputs received from the sensors 20 to control the operation of the energy consuming devices 12 and the secondary systems 14.

The user interface 22 can also be employed to define selected modes of operation for the system 10. For example, night time settings or un-occupied settings can be defined and activated as desired. Additionally, the user can log into his or her account wherever internet service is available to change the operating parameters of the system 10 or view in real time the current environmental conditions of the enclosed area 11 and operational status of the energy consuming devices 12 and the secondary systems 14. Further, the system 10 can be monitored by a human operator on behalf of the user, wherein the operator is authorized to adjust selected operational parameters of the system 10.

The user can define other operational parameters to adjust the operation of the energy consuming devices 12 and the secondary systems 14. For example, times of operation and duration of operation of specific lighting circuits or lawn sprinklers can be set. Parameters of the energy consuming devices 12 and the secondary systems 14 can also be configured to automatically adjust based on the time of sunrise or sunset, or recent rainfall, respectively, for example. The user can direct the system 10 to incorporate data from weather reporting services or motion detectors, rainfall detectors, wind speed/direction devices to automatically modify the settings for the system 10.

The module 16 also causes the operational data of the energy consuming devices 12 and the secondary systems 14, together with the inputs from the sensors 20, to be electronically stored on the server 18. The user can obtain reports through the user interface 22 that provide information on the energy consumed and the operational efficiency of the energy consuming devices 12 and the secondary systems 14. Further, the user's energy consumption can be compared to the energy consumption of other users to facilitate the identification of energy savings opportunities.

In certain embodiments, the processor 26 manages and controls the functions of the module 16 in response to particular algorithms encoded in the instruction set 30. In particular, data stored on the server 18 can be retrieved and analyzed by the processor 26 according to a pre-defined algorithm or real-time "learning" algorithm. For example, a user defined temperature set point may be adjusted by the processor 26 in response to conditions such as a solar energy received at the enclosed area, a sky condition (i.e. percent of cloud coverage), an outside air temperature, a wind speed, an efficiency formula and other data received from the sensors 20 and third-party systems. It is understood that various formulas based upon the data received from the sensors 20 and third-party systems may be used by the processor 26 to provide optimal control of the energy consuming devices 12 and the secondary systems 14.

The system 10 can also employ data from other sources to facilitate the efficient operation of the energy consuming devices 12 and the secondary systems 14. For example, a local electrical utility can provide an input to the server 18 during peak electrical demand. The peak electrical demand signal can be employed to automatically adjust the temperature settings of consumers heating and air conditioning units, thus reducing the electrical demand on the associated electrical grid. Additionally, current weather data, or sunrise and sunset times can be electronically provided to the system 10 by a third party weather reporting service. The data supplied by the third party can be employed to adjust the settings and facilitate the efficient operation of the energy consuming devices 12 and the secondary systems 14.

The system 10 including the module 16 and at least one sensor 20 can be sold together to the user. An electronic account on the server 18 is included with the purchase of the module 16 and the sensor 20. It should be understood that the account can be provided for an additional fee. Additionally, some features of the account can be offered at no charge while others such as the monitoring of the account by a human operator, for example, can have a charge associated therewith.

The unique energy management system 10 provides for the ability to monitor, control, and provide analysis of the consumption of energy by the energy consuming devices 12. Additionally, the system 10 provides for the automatic control and monitoring of the secondary systems 14 with a single integrated system 10.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An energy management system for an enclosed area, the system comprising:
    a control and uplink module adapted to selectively monitor and control at least one energy consuming device;
    a sensor adapted to execute a pre-configured measurement and generate a signal representative of the measurement;
    a server for receiving a data from at least one of the control and uplink module and the sensor to generate an analytical energy model of the enclosed area, wherein the server includes a processor with functions controlled based upon an instruction set, the instruction set including a plurality of control methods and algorithms for optimizing a regulation and efficiency of the at least one energy consuming device, the control methods and algorithms including a biasing formula for adapting a set point of the energy consuming device based on outside environmental conditions, the biasing formula calculating at least one of bias_delta, bias_wind, and bias_solar; and
    an interface adapted for the entry of at least one operational parameter to server, wherein at least one of the signal from the sensor, the data on the server, and the operational parameter is employed by the server to regulate the control and uplink module and thereby facilitate an operation of the energy consuming device.

2. The energy management system according to claim 1, wherein the sensor is pre-configured to measure at least one of an environmental condition, an operating condition of the energy consuming device, an energy consumption of the energy consuming device, a motion within the purview of the sensor, and a presence of light.

3. The energy management system according to claim 1, wherein the control and uplink module includes an alert system for generating and transmitting an automatic notification to a user upon the occurrence of a selected event.

4. The energy management system according to claim 1, wherein the interface includes a feedback report function to provide a user with information in respect of the energy consumption of the at least one energy consuming device.

5. The energy management system according to claim 1, wherein the interface is an interactive web site accessible by any device with internet connectivity.

6. The energy management system according to claim 1, wherein the sensor is adapted to facilitate a direct control of an operation of the energy consuming device.

7. The energy management system according to claim 1, wherein the instruction set further includes at least one of: a method for proportional, integral, and derivative control; a method for control based upon a difference between air temperature within the enclosed area and air temperature outside of the enclosed area; a method for controlling air circulation within the enclosed area; a method for controlling ventilation based upon the signal transmitted by the sensor; a method for adapting a pre-defined schedule of operation of the energy consuming device; a demand limitation algorithm based upon user-defined energy usage and cost thresholds; and an efficiency model pre-determined for maximizing at least one of user comfort and efficiency.

8. A method of controlling and monitoring an energy consuming device comprising the steps of:
    providing an energy management system for an enclosed area, the system including a control and uplink module adapted to selectively monitor and control at least one energy consuming device, a sensor adapted to execute a pre-configured measurement and generate a signal representative of the measurement, a server for receiving a data from at least one of the control and uplink module and the sensor to generate an analytical energy model of the enclosed area, wherein the server includes a processor with functions controlled based upon an instruction set, the instruction set including a plurality of control methods and algorithms for optimizing a regulation and efficiency of the at least one energy consuming device, the control methods and algorithms including a biasing formula for adapting a set point of the energy consuming device based on outside environmental conditions, the biasing formula calculating at least one of bias_delta, bias_wind, and bias_solar, and an interface adapted for the entry of at least one operational parameter to server, wherein at least one of the signal from the sensor, the data on the server, and the operational parameter is employed by the server to regulate the control and uplink module and thereby facilitate an operation of the energy consuming device;
    adjusting an operation of the energy consuming device in response to at least one of the at least one operational parameter, the signal transmitted by the sensor, and the data received by the server; and
    recording an electronic data representing at least one of the at least one operational parameter, the signal transmitted by the sensor, and the data received by the server.

9. The method according to claim 8, further comprising the step of reporting an operational efficiency of the energy consuming device employing the recorded electronic data.

10. The method according to claim 8, wherein the instruction set further includes at least one of: a method for proportional, integral, and derivative control; a method for control based upon a difference between air temperature within the enclosed area and air temperature outside of the enclosed area; a method for controlling air circulation within the enclosed area; a method for controlling ventilation based upon the signal transmitted by the sensor; a method for adapting a pre-defined schedule of operation of the energy consuming device; a demand limitation algorithm based upon user-defined energy usage and cost thresholds; and an efficiency model pre-determined for maximizing at least one of user comfort and efficiency.

* * * * *